United States Patent [19]

Meserow

[11] 4,224,570
[45] Sep. 23, 1980

[54] ENGINE SPEED INDICATOR

[75] Inventor: Francis P. Meserow, Highland Park, Ill.

[73] Assignee: Simpson Electric Company, a Division of American Gage & Machine Company, Elgin, Ill.

[21] Appl. No.: 968,618

[22] Filed: Dec. 11, 1978

[51] Int. Cl.² .............................................. G01P 3/36
[52] U.S. Cl. ................................. 324/175; 315/179; 324/402
[58] Field of Search ............... 324/169, 170, 175, 395, 324/402; 307/10 R; 315/149, 179, 189; 340/62

[56] References Cited

U.S. PATENT DOCUMENTS

| Re. 22,572 | 11/1944 | Miller | 324/170 |
| 1,536,808 | 5/1925 | Norden | 324/402 |
| 2,068,147 | 1/1937 | Miller | 324/170 |

Primary Examiner—Michael J. Tokar

[57] ABSTRACT

An engine rpm sensor utilizes a gas filled lamp for connection to a circuit, including an engine ignition system and a spark plug. A light pipe is exposed to the lamp and couples an optical signal each time a spark plug is fired to a remote location for utilization in a display or indicating device.

8 Claims, 7 Drawing Figures

ENGINE SPEED INDICATOR

BACKGROUND OF THE INVENTION

This invention relates generally to devices for sensing the speed of internal combustion engines. More specifically it relates to devices for sensing the revolutions per unit time of internal combustion engines.

Internal combustion engine speed sensors or tachometers are, of course, well known in the art. To the applicant's knowledge there are two methods in use at this time for this purpose. One uses a capacitive pickup while the other uses an inductive pickup electrically or magnetically coupled to the engine ignition system. In addition, it has been proposed to use various optical systems. One such system is shown in U.S. Pat. No. 3,704,405 which contemplates the provision of a perforated disk on a speedometer cable with a light source on one side of the disk and a photocell on the other side. Likewise, U.S. Pat. No. 3,348,143 suggests generally the use of magnetic, piezoelectric or optical pickup devices.

Both capacitive and inductive pickups or sensors, are susceptible in one degree or another, to unwanted and spurious signals which are strongly prevalent in a multi-linear internal combustion engine.

These spurious signals in turn are passed on or conducted into the test instrument as unwanted signals. In addition, any pickup which is connected to a remote measuring or indicating device by the use of a cable conducting electrical signals encounters the problem that the connecting cable itself, since it is a capacitive device, will pick up spurious signals emanating from the high tension ignition cables of the engine.

It is an object of this invention to provide a novel apparatus for sensing signals representative of engine rpm and coupling those signals to a remote location for utilization by indicating devices.

It is a further object of this invention to provide a novel engine rpm pickup apparatus which is not sensitive to extraneous signals which might otherwise cause false indications.

A further object is to provide a means of conducting these signals to an indicating instrument without this conductor itself becoming sensitive to spurious and extraneous signals and thus passing them on to the indicating instrument.

A still further object of this invention is to provide a novel engine rpm indicating device which does not require any means for selecting the number of cylinders in the engine, and, therefore, is relatively simple and more economical to manufacture.

A further object of the invention is to provide a novel engine rpm sensing apparatus which, because it uses a minimum of components, is less susceptible to temperature variations and is, therefore, more accurate over a wide range of temperatures.

A further object of the invention is to provide a true current operated device which is not susceptible to capacitive coupling to other high voltage conductors prevalent in an internal combustion engine.

BRIEF SUMMARY OF THE INVENTION

Briefly, one aspect of the invention is the provision of a light producing element to be connected in a circuit between a high voltage producing element of an internal combustion engine ignition system and a spark plug of the engine, and means for coupling a signal produced by that device to an indicating means.

BRIEF DESCRIPTION OF THE DRAWINGS

The invention itself is set forth in the claims which are appended hereto and form a part of the specification, while an understanding of the embodiments thereof may be had by reference to the detailed description taken in conjunction with the drawings in which:

DETAILED DESCRIPTION

Figure 1:
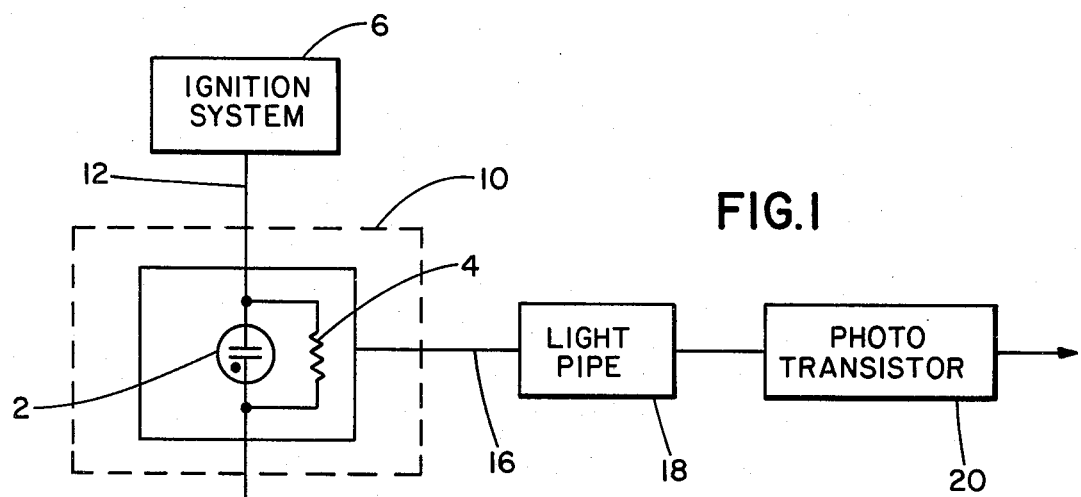
FIG. 1 is a block diagram of a preferred embodiment of an rpm sensor in accordance with the invention.

Referring to FIG. 1, a preferred embodiment of the invention is constituted by a gas filled (neon, for instance) lamp 2 shunted by a resistor 4. As may be seen, when in use the lamp 2 is connected in series between the ignition or high voltage output of an ignition system 6 and a spark plug 8. As is well known, the output of the ignition system is usually a high voltage cable connected from a distributor to a spark plug. For protection against dirt and to provide, if necessary, electromagnetic shielding, the lamp 2 and resistor 4 may be enclosed in a metallic can or housing 10, and leads 12 and 14 extend therefrom for connection as shown. Secured in the protecting housing 10, as illustrated by the line 16, is one end of a light pipe 18 so that its input end is exposed to any light produced by the firing of the neon bulb. By enclosing the light source and input end of the light pipe 18 is the housing 10 and a high percentage of the generated light impinges on it thereby increasing its strength of the transmitted optical signal. The light transmitted by the light pipe 18 is received by a phototransistor which in response to such light produces an electrical signal which may be utilized as described hereinafter.

In the operation of the system the sensor is connected as shown, and each time a high voltage pulse is produced on the electrical cable from the engine distributor. When the spark plug fires, current will flow through the resistor 4 creating a voltage drop which will fire the neon lamp 2, and the light thereby produced will be conducted via the light pipe 18 to a phototransistor 20. It should be noted that in the typical internal combustion engine ignition system the firing voltages are relatively high; usually in excess of 5000 volts. There are neon lamps available which will fire or conduct in the 70 to 100 volt range, and, of course, when they conduct they offer practically negligible resistance to the flow of current, and consequently the voltage drop across them, either for firing or during conduction, is negligible when compared to the total voltage available.

Figure 2:
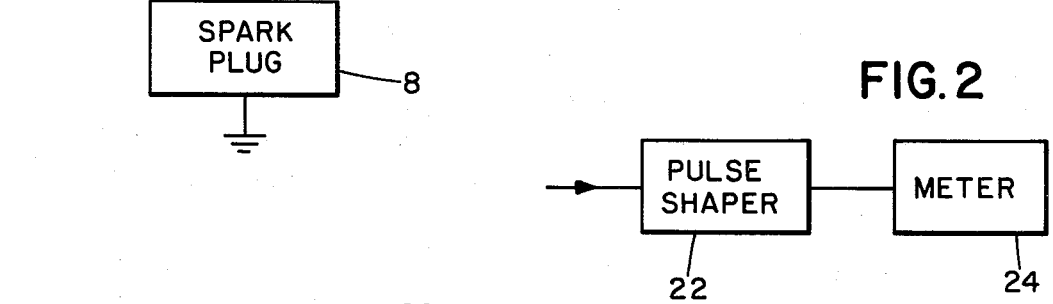
FIG. 2 is a block diagram of one type of indicator apparatus which may be used with the sensor of FIG. 1.

The electrical signal produced by the phototransistor may be utilized for a number of different purposes and for a number of different indicating devices. FIG. 2 illustrates generally one such device, namely, a tachometer. Here the output of the phototransistor is connected to a pulse shaping circuit 22 which is usually desirable as measuring instruments, and meters operate better and more consistently when their pulse inputs are uniform in shape. It may take any number of forms. The most convenient form would be that of a one shot multivibrator putting out a square wave in response to each output signal of the phototransistor 20. A meter 24 is provided which may be either of the analog or digital variety. Thus, if digital, it could count the outputs of the pulse shaper 22 in a given time interval and provide a visual indication of that number. If analog, the meter 24 will usually provide a DC signal proportional to the number of pulses per unit time and utilize a conventional meter movement driving a pointer showing the revolutions per unit time.

By utilizing the proper circuitry this will operate with either a two or four cycle engine.

As may be appreciated, an engine rpm sensor in accordance with the invention does not require any means for compensating for a variation in the number of cylinders in the engine inasmuch as each firing of a spark plug is sensed and processed as described. This eliminates the necessity for circuitry for such purposes resulting in a considerable simplification.

Figure 3:
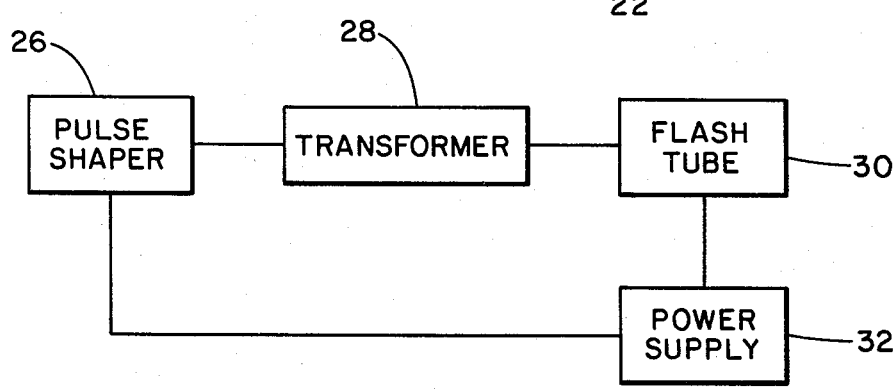
FIG. 3 is a block diagram of an alternative type of indicator apparatus which may be used with the sensor of FIG. 1.

FIG. 3 illustrates generally the manner in which an rpm sensor in accordance with the invention may be utilized with a timing light in order to adjust the ignition spark setting of an engine. In this case a pulse shaper 26 which may take the form of a differentiator in combination with an amplifier to produce sharp or steeply rising pulses is connected to the output of the phototransistor, and its output in turn is coupled by a transformer 28 to a conventional flash tube 30. A power supply 32 is connected to the pulse shaper circuit and the flash tube. In this arrangement the tube 30 flashes each time a spark plug is fired, providing a visual indication permitting adjustment of engine timing.

If it is desired to use an oscilloscope presentation the output of the phototransistor is connected once again to a pulse shaper 34, and its ouput in turn is connected to a time base generating circuit 36 constituting the input to the horizontal deflection circuit of an oscilloscope 38. The vertical deflection circuit of the oscilloscope is connected to a suitable pickup such as a capacitive pickup 40 which in turn is coupled to a high voltage lead from the ignition coil.

Figure 4:
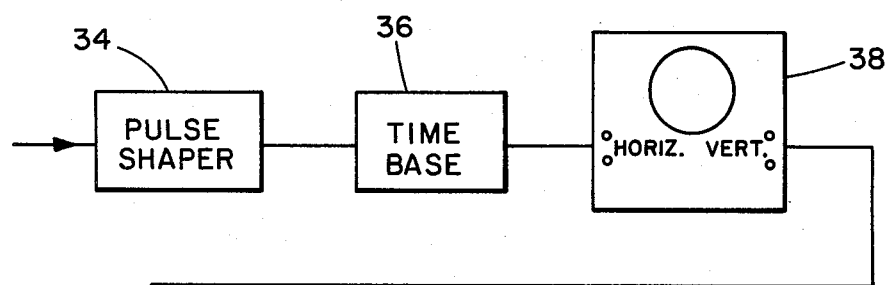
FIG. 4 is a block diagram of still another type of indicating apparatus which may be used with the sensor of FIG. 1.
Figure 4:
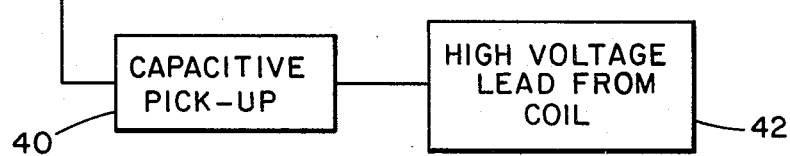
Figure 5:
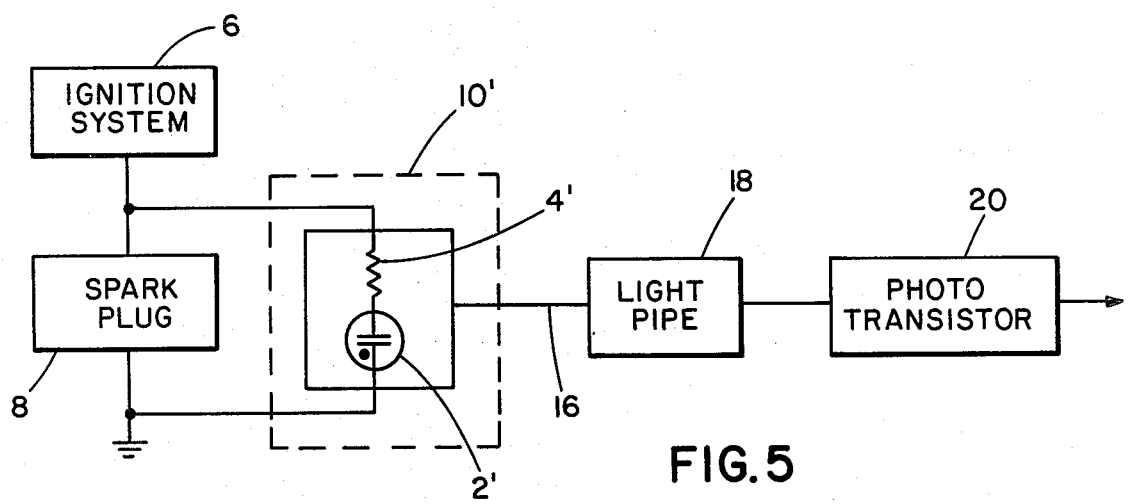
FIG. 5 is a block diagram illustration of an alternative embodiment of the invention.

FIG. 5 illustrates another embodiment of the invention wherein the sensor in accordance with the invention is connected in parallel with a spark plug 8 instead of in series as shown in FIG. 1. In this instance the neon lamp 2' is connected in series with a resistor 4' and, as before, mounted in a protective housing 10'. The light pipe 18 has its input or receiving end connected into the protector 10' as illustrated diagrammatically 16. Its output end is connected to a phototransistor 20 as before. The embodiment of FIG. 5 may be used with any one of the indicating devices shown in FIGS. 2, 3, or 4 in the same manner as the embodiment of FIG. 1.

Figure 6:
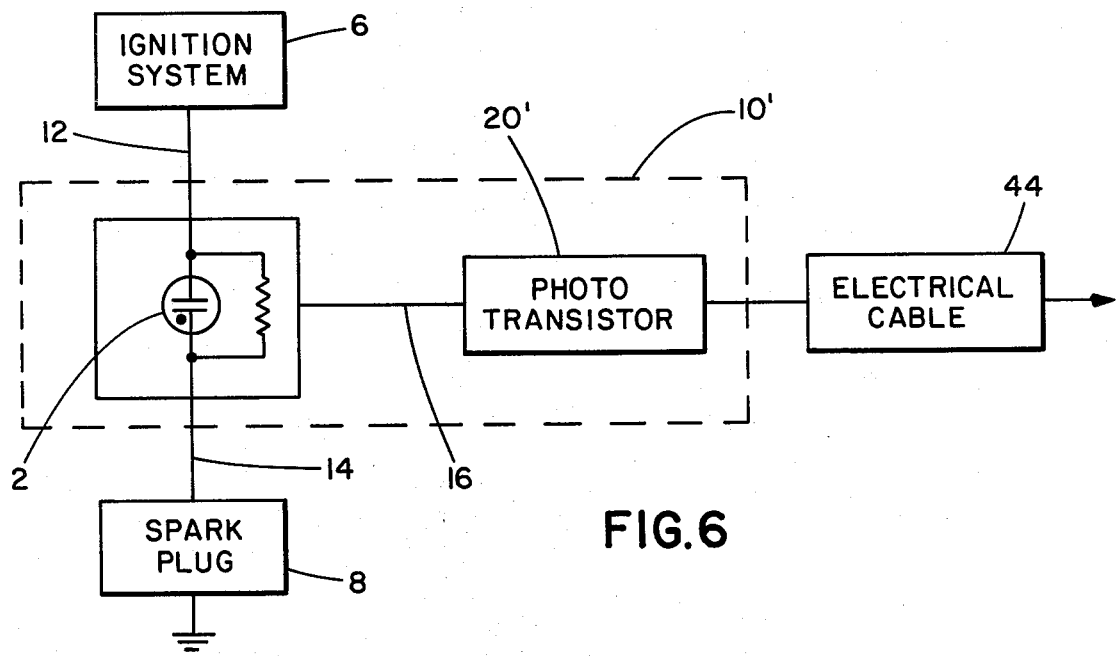
FIG. 6 is a block diagram illustration of an apparatus which utilizes an aspect of the invention to provide an engine speed sensor.
Figure 7:
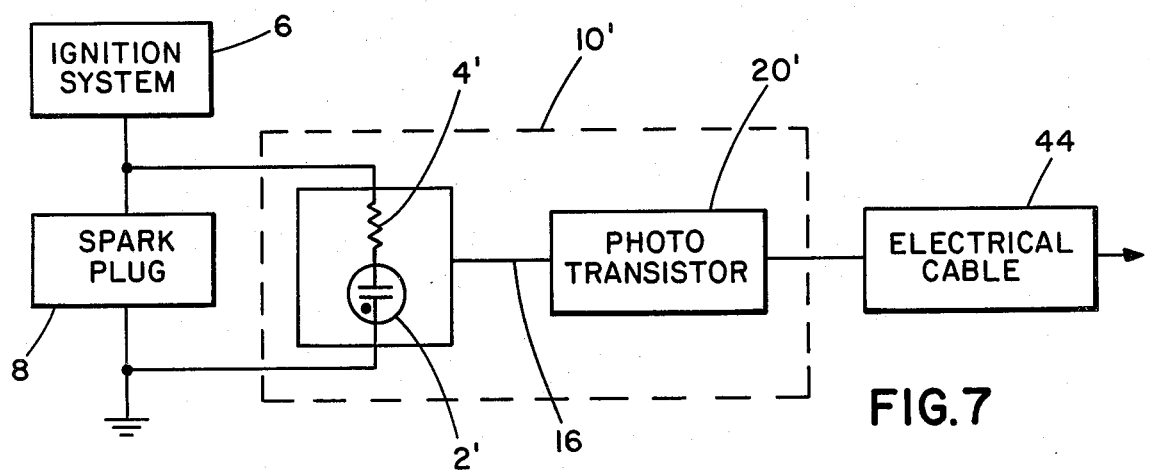
FIG. 7 is a block diagram illustration of an alternative apparatus utilizing an aspect of the invention to provide an engine speed sensor.

An important feature of the invention, and an important advantage gained thereby, is the utilization of the light pipe to couple the light output of the neon lamp to a remote location as, for instance, a portable or fixed instrument or other indicating device. However, it is believed that an aspect of the invention, namely, the use of a voltage responsive light generating device connected directly to the firing circuit of an individual engine spark plug may be utilized with certain advantages. Thus, in FIGS. 6 and 7 a neon lamp 2' may be connected in series or parallel, respectively, with a spark plug in the manner described previously. However, no light pipe is provided to couple the optical signal through a phototransistor, but rather a phototransistor 20' is included within a shielded protective housing 10' and is exposed directly to the light source. The output of the phototransistor is then coupled via a cable 44 through a desired measuring or indicating instrument. Obviously the advantages of light pipe coupling are not achieved in the apparatus disclosed in FIGS. 6 and 7. However, some of the remaining advantages of the invention are achieved.

Modifications of the invention beyond those shown and described herein may be effected by those skilled in the art, and it is intended by the claims appended hereto to cover all such modifications as come within their scope.

What is claimed as new and desired to be secured by Letters Patent is:

1. Internal combustion engine speed sensing apparatus comprising: a current responsive light producing device; means for connecting said device to the firing circuit for a spark plug in an internal combustion engine whereby said device will produce light each time the spark plug is fired; means for producing an electrical signal in response to light generated by said device; and means for providing a visible indication of the light so produced.

2. The apparatus of claim 1 including a light pipe coupling light from said device to said means for producing an electrical signal.

3. The apparatus of claim 2 wherein said device is constituted by a gas filled lamp.

4. The apparatus of claim 3 including a closed protective housing in which said device and one end of said light pipe are mounted.

5. The apparatus of claim 4 including means for connecting said device in series between a high voltage ignition source and a spark plug.

6. The apparatus of claim 4 including means for connecting said device in parallel with a high voltage ignition source and a spark plug.

7. The apparatus of claim 4 wherein said last mentioned means is constituted by a meter providing an indication of engine revolutions per unit time.

8. The apparatus of claim 4 wherein the last mentioned means is constituted by an instrument responsive to the particular time the spark plug is fired.

* * * * *